Sept. 24, 1968  G. CAMARDELLA  3,402,903
AUTOMATIC WINDING MACHINE
Filed Sept. 30, 1965  2 Sheets-Sheet 1
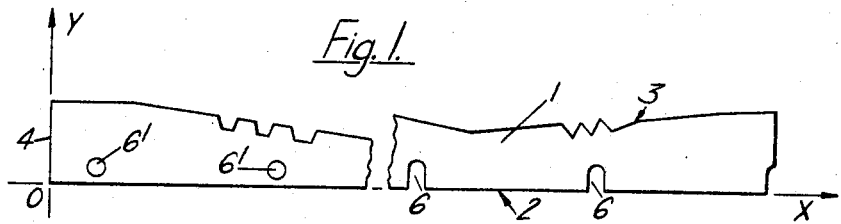
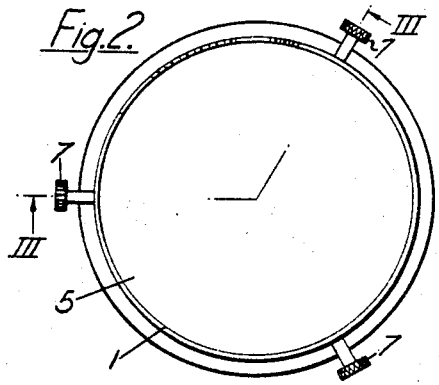
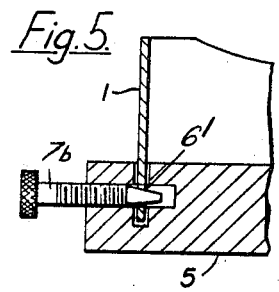
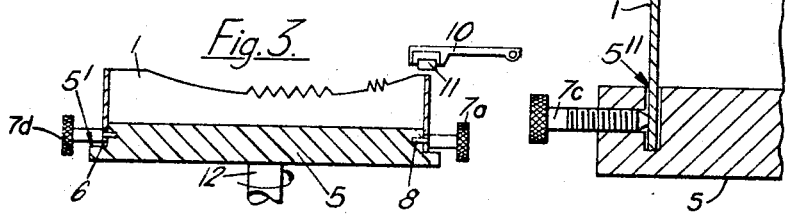
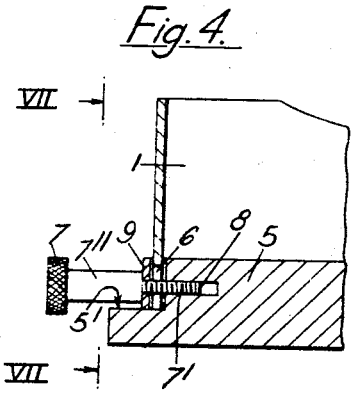
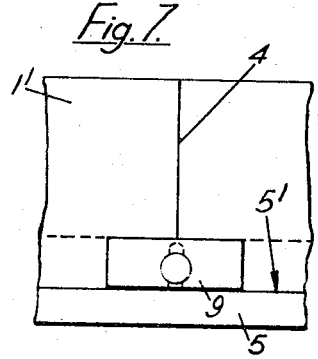
Inventor
Giuseppe Camardella
By
Stevens, Davis, Miller & Mosher
Attorneys Sept. 24, 1968  G. CAMARDELLA  3,402,903
AUTOMATIC WINDING MACHINE
Filed Sept. 30, 1965  2 Sheets-Sheet 2
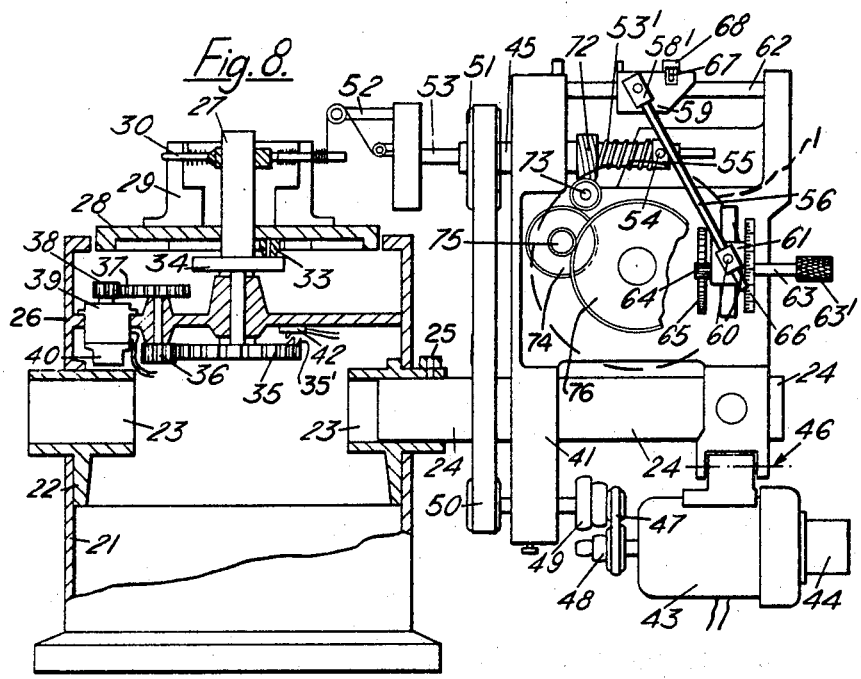
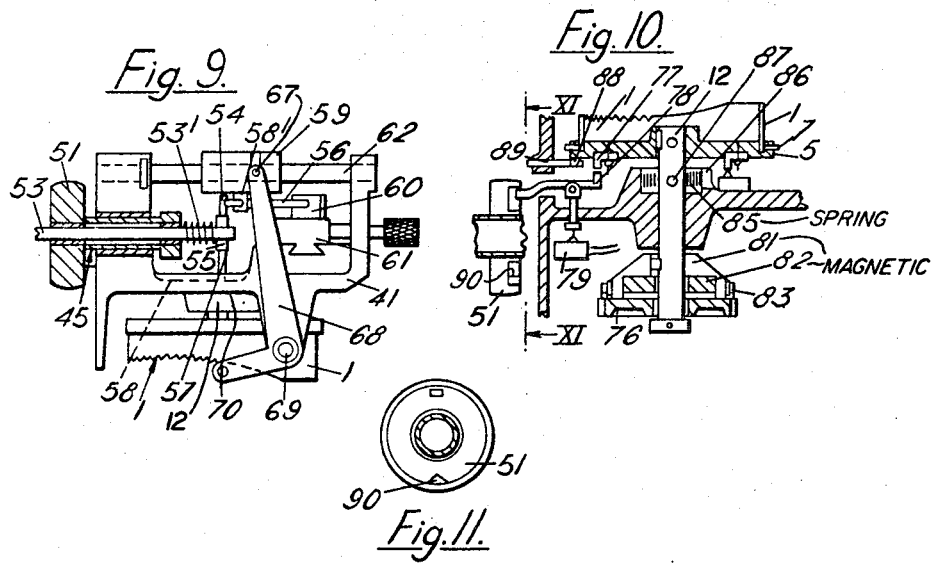
Inventor
Giuseppe Camardella
By
Stevens, Davis, Miller & Mosher
Attorneys United States Patent Office 3,402,903
Patented Sept. 24, 1968

3,402,903
AUTOMATIC WINDING MACHINE
Giuseppe Camardella, Via E. Biondi 1, Milan, Italy
Filed Sept. 30, 1965, Ser. No. 491,741
Claims priority, application Italy, Oct. 3, 1964,
51,987/64
11 Claims. (Cl. 242—158.5)

ABSTRACT OF THE DISCLOSURE

In an automatic winding machine, an axially operated circular cam which is formed by a closed band of semi-rigid material having one longitudinal edge fixed to a rotary drum. The free edge of the band is profiled according to the law of motion to be imparted by the cam.

---

It is well known that machine tools in general are with two different basic control systems, which are, on the other hand, connected with the use for which the machine tool is properly designed. Particularly complying with mass-production requirements is the system providing the use of cam kinematic motions. In this case, there is, in fact, a widespread working possibility both as to variety (for the possibility of determining for each cam a different and however pre-established motion law) and productivity. On the other hand, what this system lacks is flexibility, that is, the possibility of carrying out settings and adjustments of the motion law given by a predetermined cam.

Flexibility is, however, an essential feature on the machine tools designed for experimental or laboratory use or even intended for small production, in which designing and making cams from time to time would be extremely difficult due to cost and time.

From this angle it is then particularly interesting to consider a second adjustment system which fundamentally adopts the inventive means instead of a control cam, screw and nut attachments controlled by joints, clutches or variable ratio transmissions, or adjustable arm lever assemblies; this system has actually a relatively wide immediate possibility of regulation, although it is bound to a low productivity and a poor working variety. Particularly in the field of wire coil winders for electrical application, it is well known that an arrangement ensuring high production consists in winding the wire by means of a wire guide rotating and translating over plugs, small tubes or flanged supports, which are fixed on a preferably drum or carousel type transfer device, which is intermittently actuated during the time interval between one winding and the next one.

This basic concept, although widely applied, has not been fully exploited hitherto, and much still remains to be done in order to impart to the attachments of this type the characteristic of a high flexibility and a large production, which are often simultaneously required above all in the electronic field.

The importance of flexibility is that the use of cam kinematic motions on coil winders is almost entirely restricted to simple eccentrics or eccentrics having elementary profiles, designed to create uniform reciprocating motions. In reality, it has been also recently proposed to extend to coil winders the use of a full program cam, but this application remains bound to the inconvenience, which, as mentioned, is incidental to all machine tools, of a poor flexibility.

Most of the above-outlined inconveniences are now overcome by the use of a cam according to the present invention, showing features of easy manufacture and interchangeability, such as not to give rise any longer to a problem as to design and manufacture, either for small production runs or for laboratory work.

It is well known, in fact, that in the quasi totality of cases the cam consists of a disc against the peripheral variable profile edge of which rests a cam follower moving in the radial direction. The cam follower displacements correspond then to the variations of radial distance of the cam edge from its rotating axis.

This cam type, although as mentioned, is now of wide use, has a serious inconvenience, which is bound to its specific shape, making its use difficult: this is substantially due to the fact that, whilst the cam follower motion law is generally studied ab initio on a Cartesian basis, where the two coordinates linearly represent time and displacement, respectively, such law should then be transferred to a polar basis to be brought back on the cam disc. This involves evidently complications not only from the standpoint of design but also from the standpoint of practical execution, because for these cams it is necessary to provide an accurate machining of the profile.

According to the present invention, a cam of the so-called axially acting type is proposed, which permits on the one side to directly utilize a Cartesian orthogonal representation of the motion law and on the other side to be of extremely simple and economical execution. Said cam is substantially characterized in that it is constituted of a segment consisting of semi-rigid band one of the longitudinal edges of which represents the cam motion law on a Cartesian basis in which the times are disposed along the abscissa parallel to the length of the band and the displacements in direction of the corresponding ordinates, the other longitudinal edge being anchored to the periphery of a rotary drum.

In the application of this cam, particularly to the winding head of a coil winder to attain an excellent flexibility, it is further proposed according to the present invention to associate with said coil winder a control and adjustment assembly for transmitting the motion of the cam to the wire guide, comprising adjusting means for the transmission ratio of said motion, adjusting means for the rotating speed ratio of the cam and wire guide, and adjusting means for the width of the cam sector utilized for a given cycle.

The invention is, however, better described with reference to the accompanying drawings representing some preferred non-limiting embodiments, in which:

FIG. 1 illustrates two portions of a band forming the cam the upper profile of which gives the motion law of the cam itself;

FIG. 2 is a plan of the support drum of the band with the related band mounted thereon;

FIG. 3 is a section along the line III—III in FIG. 2;

FIGS. 4, 5 and 6 are section views on an enlarged scale of different connecting devices of the band to the drum;

FIG. 7 is a section along the line VII—VII in FIG. 4;

FIG. 8 is a schematic elevation view of the winding head utilizing the band cam;

FIG. 9 is a plan view of said winding head;

FIG. 10 is an axial section of the cam assembly with related support drum and control clutch; and FIG. 11 is a view, partially in section, along the line XI—XI in FIG. 10.

As shown in FIG. 1, the semi-rigid band 1 designed to constitute the cam shows the lower edge 2 perfectly rectilinear and the upper edge 3 profiled according to the motion law of the cam itself. This motion law is expressed on a Cartesian basis the edge 2 of the band representing the axis $x$ or the abscissae and the head edge 4 the axis $y$ or the ordinate, the corner formed by the edges 2 and 4 constituting the origin of the Cartesian coordinates. The band 1 is applied to the drum 5 via the slots 6, for example as shown in FIGS. 2, 3, 4, and 7. To this effect, the drum 5 shows a flange or groove the surface 5' of which is perfectly machine finished to constitute the support plane of the band 1, namely the origin of the ordinates. A set of bolts 7 (shown in detail as bolts 7a to 7c in FIGS. 4 to 6), which in the case represented are three in number, engage in threaded holes 8 and serve to lock the band 1. The latter is inserted with the slots 6 at the threaded portion 7' of the bolts 7 and depressed until edge 2 cams in contact with the surface 5'; in this position the bolts 7 are tightened and they lock with their enlarged portion 7'' holding the band 1 against the drum 5. In order to ensure a better band fastening at the joint between the ends of the band 1, an anchoring plate 9 as shown in FIGS. 4 and 7 is provided. Once mounted, the band 1 constitutes together with the drum 5 the aforementioned cam assembly (see FIGS. 3 and 10). For operation in conjunction with this cam is preferably provided a cam follower 10 fitted with a contact roller 11 resting on the profile 3 of the cam. The drum 5 is imparted with rotation through its support shaft 12 at a speed which is proportional to the scale of times chosen at the band length. The band 1 may be alternatively fastened on the drum 5 as represented in FIGS. 5 and 6, without it being necessary to provide for the slots 6. In this instance the drum is provided, in lieu of the flange 5', with a slot 5'' in which the band is inserted. In this manner, the band 1 finds a perfect anchoring inside the slot 5'', particularly if the latter has a suitable width correspondingly to the band thickness.

In order to improve the anchoring, a bolt 7c is provided for example with a point head, which is tightened against the band 1 so as to impede its voluntary outgoing from the slot 5''. Since the bottom plane of the slot 5'' does not lend itself very well to being taken as origin of the ordinates, the setting in height of the band is arranged via a groove of the band itself in which engages the point of the bolt 7c (see FIG. 6) or a set of centering holes 6' in which directly engage the conical ends of the bolts 7b (see FIG. 5).

The coil winder according to the present invention, which utilizes the aforementioned cam, is represented as a whole in FIG. 8. It essentially involves a base 21 which supports the annular structure 22 provided with radial holes 23. In the holes 23 are fastened the support shafts of the operating stations; of these only the hollow shaft 24 of the winding head fastened by means of the screw 25 is represented.

On the structure 22 is fastened further the frame 26 of the support carousel of the coil to be wound. In center of the frame is fastened the shaft 27 which constitutes the free rotating pin of the rotary table 28, provided with the crown 29 of plugs 30; the rotary table 28 is also designed to support accessories adapted to carry out particular working on the plugs 30. The intermittent rotation of the table 28 is generated by the knob 33 supported by the shaped disc 34, which is caused to rotate via the gears 35, 36, 37, 38 by the motor 39 provided with brake 40. The knob 33 drags the table 28 by means of radial cavities provided on its lower part, for example by a Maltese cross advancement system and subsequent locking; at the end of each dragging cycle the table 28 is stopped by the mechanical switch contactor 42, which has the dual function to break off the current from the motor 39 and to energize the motors of the operating stations, particularly the motor 43 of the winding head.

Underneath the frame 41 of the winding head is fastened the head driving system; this is constituted of a two-speed motor 43 with brake 44, which may oscillate on its support axis 46 for tensioning the belt 47 between the two cones of the pulleys 48 and 49 constituting the variable transmission.

From the pulley 49 the motion is transmitted to the belt 50 and the pulley 51 for the motion transmission to the wire guide 52. The shaft 53 of the wire guide is rotatable with the pulley 51 but sliding in relation thereto.

The sliding shaft 53 is thrust by the spring 53' (FIG. 8) to its backward position (that is to say, to right-hand side of FIG. 1) so as to maintain the pin 54 of the collar 55 constantly in contact with the rod 56. The collar 55 is freely rotatable, but axially locked in relation to the shaft 53 by backing means, so that it follows the shaft 53 in its axial displacements, but remains locked in the rotation by the action of the plug 57 the end of which slides in a groove 58 of the frame. The rod 56 (FIG. 9) is pivoted in 58' on the slider 59 and locked via the oscillating sleeve 60 on the semifixed slider 61. The sleeve 60 ensures both the oscillation and the free axial sliding of the rod 56, and hence does not prevent the slider 59 from sliding over the track 62. The locking between rod 56 and sleeve 60 equally ensures manual displacement of the semifixed slider 61 in relation to the graduation 66; in this way, it is possible to vary the ratio between the spaces run by the slider 59 and those run by the pin 54, that is by the wire guide assembly. The setting of the position of the slider 61 is made with the aid of the small shaft 63, provided with a control knob 63' and a pinion 64 meshing with the stationary rack 65 and is controlled in relation to the graduated scale 66. The slider 59 is set in motion by the pin 67 carried by the lever 68, which is pivoted in 69, and by means of the finger 70 in contact with the cam 1, against which it is maintained by the load of the spring 53' through 55, 54, 56, 59, 67.

It follows then by setting the cam 1 in rotation its profile is followed by the finger 70 and generates, through the lever 68 and related control assembly, proportional excursions of the wire guide 52; this proportionality is given not only by the ratio established by the arms of the interplaced stationary levers, but also by the variable arm of the lever 56, adjusted according to the position of the slider 61.

According to the present invention, the rotation of the cam 1 (FIG. 8) is generated by the rotation of the shaft 45, that is to say, by the rotation of the wire guide through a set of wheelworks constituted of the gears 72, 73, 74, 75, 76, some of which are easily replaceable to vary the drive ratio between shaft 45 and cam 1. It follows that for the same profile of the cam 1 by the variation of this ratio also varies the number of turns contained in the same winding width in opposition to the fact that by varying the position of the slider 61 said winding width varies with the same number of turns.

The device according to the present invention ensures, however, a third adjustment type permitting, in addition to the aforesaid adjustments, to partialize the control of the cam 1, utilizing for a given cycle only one sector of the cam itself (FIG. 10); this is obtained by angularly displacing the adjustable tooth 77 which, after the desired rotation of the cam 1, knocks against the lever 78 causing by means of the switch 79 the stopping of the electric motor 43.

It is interesting to note that the action of the tooth 77 on the lever 78 does not definitely carry out the operation of the contact 79, but only presets it; in fact, the determining final action proceeds from the nose 90 of the pulley 51 (FIG. 11) which acts on the other end of the lever 78. Consequently, independently of the adjustment of the tooth 77, the pulley 51 and with it the wire guide 52, always stops in the provided basic position. This instantaneous stop is eased by the fact that the tooth 77 is a double tooth and always acts, before acting on the lever 78, on a multiple contact (not shown) which operates the motor commutation at a much lower speed (⅛ or ⅒ of the working speed), so that the action of the brake 44 is then of extreme effectiveness and promptness.

The possibility of repeating in a succession of operating cycles the use of one only sector of the cam 1 is ensured by the particular construction of the dragging control; in fact, the gear 76 is loose on the shaft 12 of the cam 1, and is made integral therewith only when related magnetic connecting joint 81–82 is actuated. This joint is constituted, in the case illustrated, of the plate 81, keyed on the shaft 12 and the excitation coil 82 to which the current is supplied through the slip ring 83 and the ground.

When the aforementioned joint is operating, the gear 76 now integral with the shaft 12 sets the cam 1 in rotation, but at the same time loads the helical spring 85 the two extremes of which are respectively locked to the frame in 86 and to the shaft 12 by pin 87.

With the termination of the action of the joint 81, the shaft 12 now free is returned through the spring 85 together with the cam 1 towards the starting position which is defined by the stopping of the nose 88 against the pin 89.

A brake system (not shown) may alleviate the impact effect.

It is interesting to note that the cam 1 should not be necessarily provided with a reciprocating rotating motion. In several cases, for example with a very high number of turns, it is particularly interesting to have the possibility of utilizing not only the entire development of the cam, but also more times the same development; the exclusion of the pin 89, the release of the spring 85 and the continuous action of the electromagnetic joint ensure a rotation continuity of the cam in the same direction under the control of different adjusting means (not shown).

Above mention has been made of an electric coordination between carousel and winding head, obtained from the switch 42; also the contactor 79 has an analogous dual task, namely that to stop the motor 43 of the head and simultaneously to start in the motor 39 of the carousel.

It is understood that other changed embodiments than those described in the present specification could be developed, without departing from the scope of the invention.

What is claimed is:

1. An automatic winding machine comprising a base, carousel means mounted on said base for winding a coil thereon, first drive means operatively connected to rotate said carousel means, winding head means comprising a frame mounted on said base, wire guide means mounted on said frame, second drive means operatively connected to said wire guide means, and guide control means comprising circular cam means, adjustable control means operatively connected to axially drive said wire guide from said cam means, said cam means comprising a rotatable drum and an axially directed upstanding semi-rigid band member mounted thereon, said band having a linear longitudinal edge fixedly mounted on the periphery of said drum, the other longitudinal edge being profiled according to the law of motion to be imparted by the cam, and locking means for detachably locking said band on said drum.

2. An automatic winding machine according to claim 1 in which said rotatable drum includes a perfectly machine finished, peripherial flange portion upon which rests the linear edge of said band is locked.

3. An automatic winding machine according to claim 1 in which said locking means comprise a plurality of bolts disposed about said drum, said bolts having one end threaded and the other end enlarged to form a head, said band being secured by threadingly engaging said bolts into said drum until said head bears against said band.

4. An automatic winding machine according to claim 1 in which said rotatable drum includes a circular slot adjacent the periphery thereof, said slot being of uniform depth and having substantially the same width as the thickness of said band, and said band being locked in said slot.

5. An automatic winding machine according to claim 4 in which said locking means comprises a plurality of bolts having a pointed end portion adapted to depress said band in said slot thereby adjustably securing said band therein.

6. An automatic winding machine according to claim 4 in which said locking means comprises a plurality of bolts having a substantially blunt conical end portion adapted to engage with said band.

7. An automatic winding machine according to claim 1 in which said cam means drum is rotated by second drive means and by adjustable control means comprising drive ratio adjusting means to adjust the ratio of rotating speeds of the cam means and wire guide means and joint means which is selectively actuatable at the end of each winding cycle.

8. An automatic winding machine according to claim 7 in which said joint means includes spring means biasing said cam towards a neutral position upon deactuation of said joint means.

9. An automatic winding machine according to claim 7 in which said joint means is magnetic.

10. An automatic winding machine according to claim 1 in which the axially controlled drive motion of said cam means to the wire guide means passes through motion amplifying means comprising at least one adjustable arm lever.

11. An automatic winding machine according to claim 1 in which said adjustable control means comprises drive ratio adjusting means to adjust the transmission ratio of the axial displacements of the cam means and wire guide means, and adjusting means for controlling the sector of said cam utilized for a selected working cycle.

References Cited

UNITED STATES PATENTS

| | | | |
|---|---|---|---|
| 1,118,579 | 1/1914 | Pilkington | 74—568 X |
| 1,302,024 | 4/1919 | Evensen | 74—568 |
| 1,673,887 | 6/1928 | Selvig | 242—158.5 |
| 2,298,819 | 10/1942 | Brugger | 242—158.5 |
| 2,387,149 | 10/1945 | Hicks | 74—568 |
| 2,777,513 | 1/1957 | Cooper | 74—568 |
| 2,402,447 | 6/1946 | Pritchard. | |

FRANK J. COHEN, *Primary Examiner.*

NATHAN L. MINTZ, *Assistant Examiner.*